Aug. 9, 1938.     C. E. BERGH     2,126,240
BAND CONVEYER
Filed Dec. 24, 1935

INVENTOR:
CARL ERLAND BERGH
BY Haseltine, Lake & Co.
ATTORNEYS

Patented Aug. 9, 1938

2,126,240

UNITED STATES PATENT OFFICE 2,126,240

BAND CONVEYER

Carl Erland Bergh, Langshyttan, Sweden

Application December 24, 1935, Serial No. 55,943
In Sweden September 29, 1932

2 Claims. (Cl. 198—201)

The usual steel band conveyers which consist of flat endless steel bands running upon rollers are connected with certain drawbacks, one of the most conspicuous of which is that the material to be conveyed has difficulty in remaining on the band and falls laterally of the same before reaching the discharge place. It is also clear that a flat conveyer cannot transport the same quantity of material as a concave one during the same period.

An object of the present invention is to provide a conveyer which unites in itself the advantages of the flat steel band conveyers and those of the concave belt conveyers.

A further object of the invention is to provide a conveyer in which the simple driving devices intended for the flat steel band conveyers may be used and the same quantity of material may be conveyed per unit of time as by the concave belt conveyers.

Figure 1:
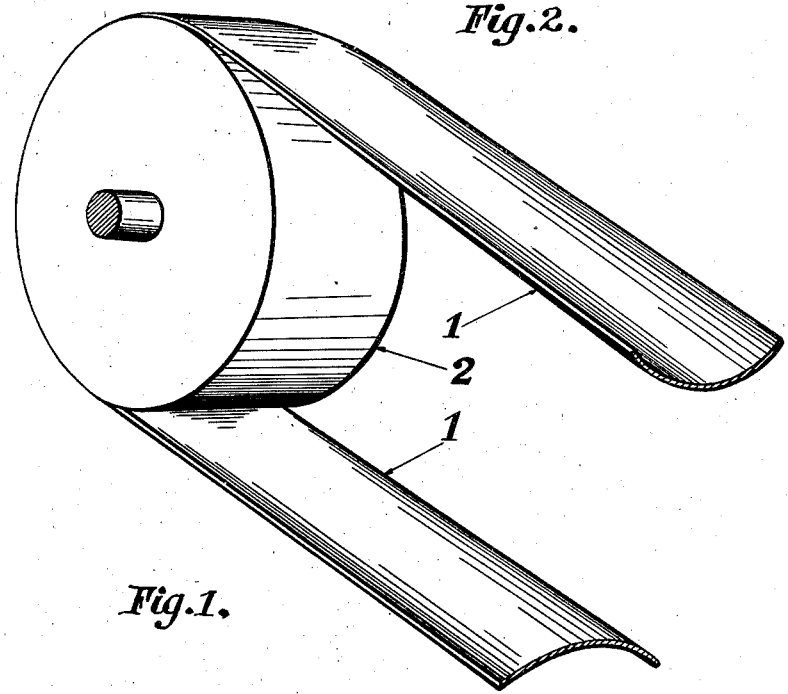

The invention is illustrated by way of example in the accompanying drawing, in which Figure 1 represents a perspective view of the part of a band conveyer where the band passes a break idler roller.

Figure 2:
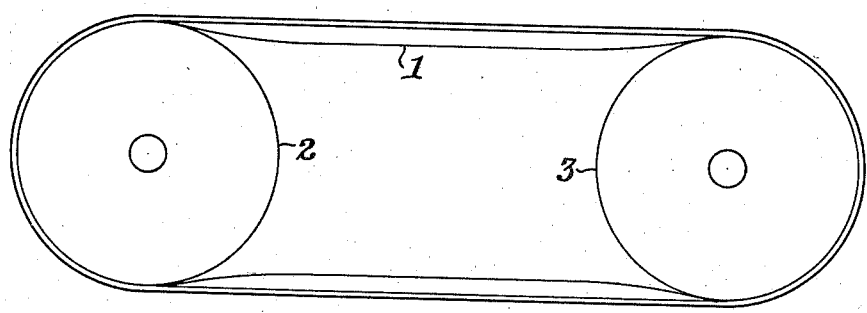

Figure 2 is a side elevation of the same band conveyer with two break rollers and the conveyer band in position thereon.

The concave steel band which for example is driven by means of rollers is indicated by 1 in Figure 1 and the break idler roller by 2. When the band 1 passes the break idler roller 2 the band obtains a flat cross section but due to its great elasticity the band immediately reassumes its concave form after having passed the return point. This is also evident in Figure 2, wherein it may also be noted that the band 1 is capable of supporting itself between rollers 2 and 3 by its resistance to sagging.

Thus, the above mentioned drawbacks of the flat steel band conveyers hitherto used are removed by using a steel band having itself a concave cross section.

Having now described my invention, what I claim as new and desire to secure by Letters Patent is:

1. A band conveyer comprising an actively resilient steel conveyer band running over break rollers which is inherently exteriorly concave in cross section so as to automatically form a shallow trough in unrestrained condition between the rollers and capable of being temporarily completely flattened in cross section upon running over a break roller.

2. In a conveyer including a metal conveyer band according to claim 1, the features of having the band endless and made of thin resilient spring steel which is slightly concave and capable of supporting itself between spaced break rollers.

CARL ERLAND BERGH.